United States Patent
Berg et al.

(10) Patent No.: US 8,561,016 B2
(45) Date of Patent: Oct. 15, 2013

(54) SCOPED CODE FLY-OUT EDITOR FOR DOMAIN LANGUAGES

(75) Inventors: Daniel C. Berg, Holly Springs, NC (US); Susanta Datta, Nepean (CA); Eric O. Funk, Kanata (CA)

(73) Assignee: International Business Machines Corporation, Armonk, NY (US)

( * ) Notice: Subject to any disclaimer, the term of this patent is extended or adjusted under 35 U.S.C. 154(b) by 273 days.

(21) Appl. No.: 12/829,507

(22) Filed: Jul. 2, 2010

(65) Prior Publication Data
US 2012/0005648 A1    Jan. 5, 2012

(30) Foreign Application Priority Data
Jun. 29, 2010  (CA) ..................................... 2706747

(51) Int. Cl.
*G06F 9/44*      (2006.01)
(52) U.S. Cl.
USPC ........................... 717/105; 717/104; 717/113
(58) Field of Classification Search
None
See application file for complete search history.

(56) References Cited

U.S. PATENT DOCUMENTS

| | | | |
|---|---|---|---|
| 6,067,413 A * | 5/2000 | Gustafsson et al. ........... | 717/114 |
| 6,237,135 B1 | 5/2001 | Timbol | |
| 6,282,699 B1 | 8/2001 | Zhang et al. | |
| 6,851,107 B1 * | 2/2005 | Coad et al. .................... | 717/108 |
| 6,857,103 B1 | 2/2005 | Wason | |
| 7,051,316 B2 | 5/2006 | Charisius et al. | |
| 7,191,405 B1 | 3/2007 | Jaramillo | |
| 7,237,193 B1 | 6/2007 | Zaky et al. | |
| 7,331,042 B2 | 2/2008 | Kulp et al. | |
| 7,877,731 B2 * | 1/2011 | Bekelman ...................... | 717/113 |
| 7,949,995 B2 * | 5/2011 | Sadlek .......................... | 717/113 |
| 7,975,233 B2 * | 7/2011 | Macklem et al. .............. | 717/105 |
| 8,001,519 B2 * | 8/2011 | Conallen et al. .............. | 717/105 |
| 8,006,224 B2 * | 8/2011 | Bateman et al. .............. | 717/104 |
| 8,166,449 B2 * | 4/2012 | Jazdzewski .................... | 717/113 |
| 2002/0023257 A1 | 2/2002 | Charisius et al. | |
| 2004/0034846 A1 * | 2/2004 | Ortal et al. ..................... | 717/113 |
| 2005/0114769 A1 * | 5/2005 | Arkhipov et al. .............. | 715/531 |
| 2007/0277151 A1 | 11/2007 | Brunel et al. | |
| 2007/0288887 A1 * | 12/2007 | Pepin et al. .................... | 717/105 |
| 2008/0086701 A1 * | 4/2008 | Stokes et al. ................... | 715/808 |
| 2009/0070737 A1 * | 3/2009 | Huang et al. .................. | 717/105 |

(Continued)

OTHER PUBLICATIONS

Terceiro et al., Analizo: an Extensible Multi-Language Source Code Analysis and Visualization Toolkit, [Online] 2010, [Retrieved from the Internet] <http://analizo.org/pub/Site/Documentation/analizo-cbsoft2010-tools.pdf>, 6 pages.*

(Continued)

*Primary Examiner* — Thuy Dao
*Assistant Examiner* — Ravi K Sinha
(74) *Attorney, Agent, or Firm* — Thomas E. Lees, LLC (57) ABSTRACT

A method for generating a model diagram includes registering a scoped domain editor extender with a domain model element, retrieving a domain model and sending the domain model to the registered scoped domain editor extender, generating a modeling language model and mapping the modeling language model to the domain model, retrieving a domain model element from the domain model, generating a modeling language model element and associating the modeling language model element with the domain model, generating a graphical diagram including a shape corresponding to the modeling language model element, generating a user input item and associate the user input item with the modeling language model element, and displaying the shape and the user input item to a user.

18 Claims, 7 Drawing Sheets

(56) References Cited

U.S. PATENT DOCUMENTS

| | | | |
|---|---|---|---|
| 2009/0125877 A1* | 5/2009 | Kuzsma et al. | 717/105 |
| 2009/0150856 A1* | 6/2009 | Elaasar et al. | 717/104 |
| 2009/0187882 A1* | 7/2009 | Jazdzewski | 717/105 |
| 2009/0235229 A1* | 9/2009 | Dangeville et al. | 717/105 |
| 2009/0241089 A1* | 9/2009 | Ramamoorthy et al. | 717/105 |
| 2010/0037202 A1* | 2/2010 | Schubert | 717/105 |
| 2011/0041117 A1* | 2/2011 | Grechanlk et al. | 717/104 |
| 2011/0239183 A1* | 9/2011 | Paradkar et al. | 717/104 |
| 2012/0042299 A1* | 2/2012 | Perrin et al. | 717/104 |

OTHER PUBLICATIONS

Eric Tanter and jacques Noye, A versatile Kernel for Multi-Langugage AOP, [Online] Generative Programming and Component Engineering Lecture Notes in Computer Science vol. 3676, 2005, [Retrieved from the Internet] <http://link.springer.com/content/pdf/10.1007%2F11561347_13.pdf> pp. 173-188.*

Sven Apel and Christian Lengauer, Superimposition: A Language-Independent Approach to Software Composition, [Online] 2008, [Retrieved from the Internet] <http://link.springer.com/content/pdf/10.1007%2F978-3-540-78789-1_2.pdf> pp. 20-35.*

Serge Glushchenko, Diagram Studio 3.5, [online]; [retrieved on Dec. 14, 2009]; retrieved from the Internet http://www.softwaregeek.com/download/diagramstudio.html.

Rational Software Architect Standard Edition Version 7.5 Releases; Java Domain Modeling, [online]; [retrieved on Nov. 12, 2009]; retrieved from the Internet http://www-01.ibm.com/support/docview.wss?rs=3540&uid=swg27014042#whatsnew_754_cpp_transform.

Java Round-Trip Code Engineering, [online]; [retrieved on Nov. 12, 2009]; retrieved from the Internet http://www.visual-paradigm.com/product/vpum/provides/codedbeng.jsp.

Quick Sequence Diagram Editor, [online]; [retrieved on Dec. 14, 2009]; retrieved from the Internet http://sourceforge.net/projects/sdedit/.

Sequence Diagram, [online]; [retrieved on Dec. 14, 2009]; retrieved from the Internet http://www.codeswat.com/cswat/index.php?option=com.

Lisisoft.com, "Free Download—SDE for Eclipse (LE) for Windows", (online) retrieved from http://web.archive.org/web/20100426014256/http://www.lisisoft.com/free-download-version/105324-sde-for-eclipse-le-for-windows.html, archive date of Apr. 26, 2010.

* cited by examiner

SCOPED CODE FLY-OUT EDITOR FOR DOMAIN LANGUAGES

CROSS-REFERENCE TO RELATED APPLICATIONS

This application claims priority to Canadian Patent Application No. 2706747 filed 29 Jun. 2010, and all the benefits accruing therefrom under 35 U.S.C. §119, the contents of which in its entirety are herein incorporated by reference.

BACKGROUND

The present invention relates to computer code editors, and more specifically, to visual code editors and domain language visual scoped editors.

Visual code editors for programming codes such as Java may include visualizing features that present Java methods as a Unified Modeling Language (UML) diagram that visually represents elements of the code. The diagram represents a domain language for example, Java, and typically includes code blocks that represent programming elements such as loops and if/else statements; however the code blocks do not include details of the code represented by the blocks. It is useful for a user to have the ability to easily review specific code details represented by the blocks when analyzing a diagram.

BRIEF SUMMARY

According to one embodiment of the present invention, a method for generating a model diagram includes registering a scoped domain editor extender with a domain model element, retrieving a domain model and sending the domain model to the registered scoped domain editor extender, generating a modeling language model and mapping the modeling language model to the domain model, retrieving a domain model element from the domain model, generating a modeling language model element and associating the modeling language model element with the domain model, generating a graphical diagram including a shape corresponding to the modeling language model element, generating a user input item and associate the user input item with the modeling language model element, and displaying the shape and the user input item to a user.

According to another one embodiment of the present invention a method for generating a fly-out editor window includes receiving an input from a user selecting an input item, identifying and retrieving a modeling language model element associated with the selected input item, retrieving a domain model element associated with the modeling language model element from a domain model, determining whether a scoped editor is registered for the domain model element, sending the domain model and the domain model element to an extender responsive to determining that the scoped editor is registered for the domain model element, generating a scoped code editor and displaying text associated with the domain model element in a fly-out editor window to a user.

According to yet another one embodiment of the present invention, a system for generating a diagram including a processor operative to register a scoped domain editor extender with a domain model element, retrieve a domain model and sending the domain model to the registered scoped domain editor extender, generate a modeling language model and mapping the modeling language model to the domain model, retrieve a domain model element from the domain model, generate a modeling language model element and associating the modeling language model element with the domain model, generate a graphical diagram including a shape corresponding to the modeling language model element, generate a user input item and associate the user input item with the modeling language model element, and send the shape and the user input item to a display.

Additional features and advantages are realized through the techniques of the present invention. Other embodiments and aspects of the invention are described in detail herein and are considered a part of the claimed invention. For a better understanding of the invention with the advantages and the features, refer to the description and to the drawings.

BRIEF DESCRIPTION OF THE SEVERAL VIEWS OF THE DRAWINGS

The subject matter which is regarded as the invention is particularly pointed out and distinctly claimed in the claims at the conclusion of the specification. The forgoing and other features, and advantages of the invention are apparent from the following detailed description taken in conjunction with the accompanying drawings in which:

DETAILED DESCRIPTION

Figure 1:
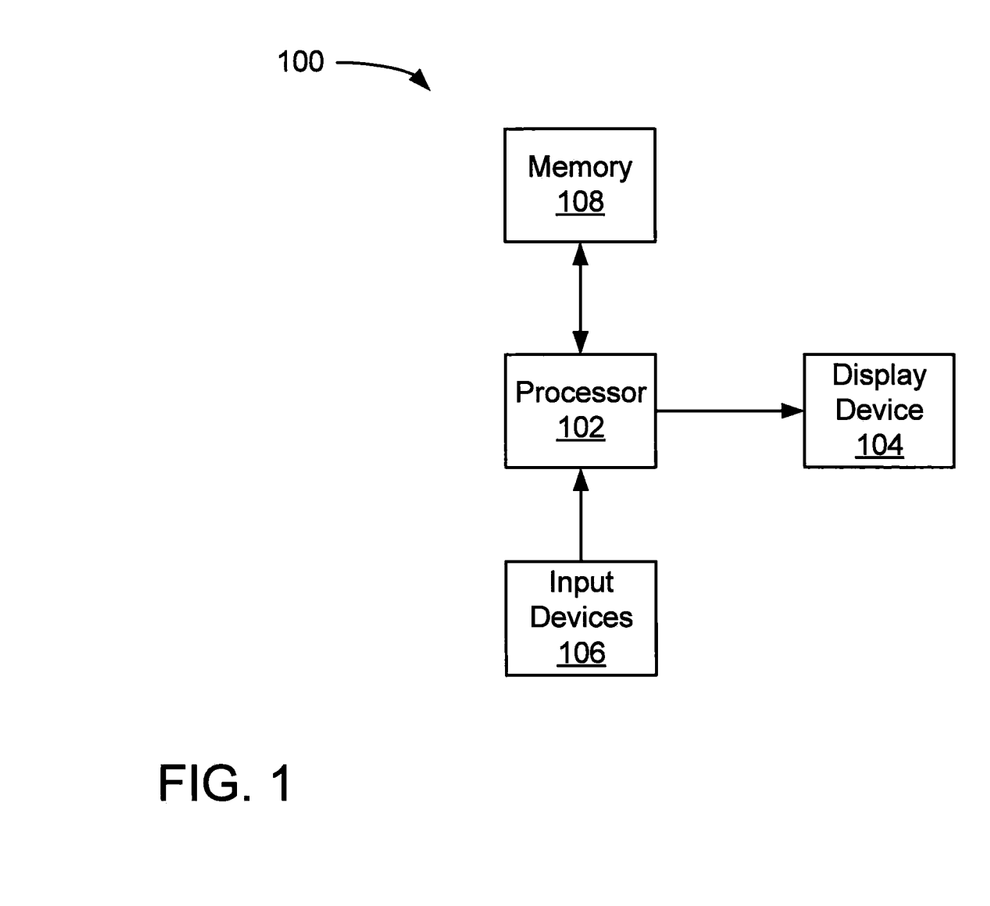
FIG. 1 illustrates an exemplary embodiment of a system.

FIG. 1 illustrates an exemplary embodiment of a system 100. The system 100 includes a processor 102, a display device (display) 104, input devices 106, and a memory 108. The system 100 is operative to perform the exemplary methods described below.

Figure 2:
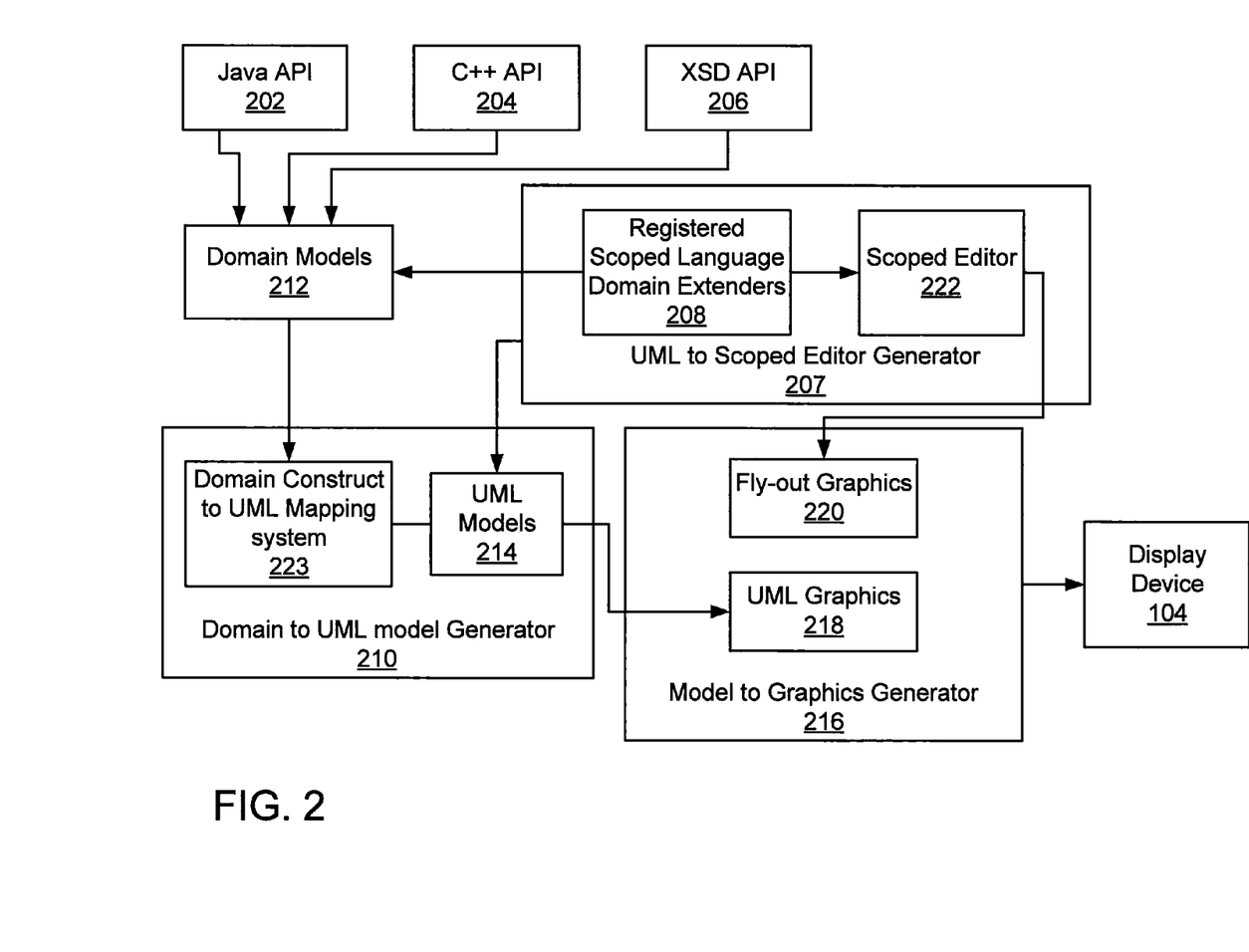
FIG. 2 illustrates a high level block diagram of an exemplary embodiment of a scheme for displaying code elements.

FIG. 2 illustrates a high level block diagram of an exemplary embodiment of a scheme for displaying code elements. The scheme may be implemented, by for example, executable computer code stored in the memory 108 and processed in the processor 102 (of FIG. 1). The illustrated embodiment includes a plurality of application programming interfaces (API's) that extract domain language constructs, for example, a Java API 202 extracts Java language constructs, a C++ API 204 extracts C++ language constructs, and a XML Scheme Definition (XSD) API 206 extracts XSD language constructs. The illustrated embodiment may include any number or type of APIs. A domain to UML mapping system 223 may receive domain model 212 data from the API's 202, 204, and 206 and send the data to a domain to unified modeling language (UML) model generator 210 that generates a UML model 214 that is mapped (corresponds) to the domain model 212. Each API 202, 204, and 206 may be associated with a respective domain model 212 and UML model 214. The UML model 214 is sent to a model to graphics generator 216 that generates UML graphics 218 and sends the UML graphics 218 to the display device 104 for presentation to a user. A scoped editor 222 receives data from the API's 202, 204, and 206 via the registered scoped language domain extenders 208 and sends the data to the model to graphics generator 216 that generates fly-out graphics 220 that may be sent to the display device 104.

The illustrated exemplary embodiments include the use of the UML as modeling language, however the use of UML in the exemplary embodiments is merely illustrative. Any suitable alternative abstract modeling language (modeling language) and modeling language models may be similarly used in alternate embodiments.

Figure 3:
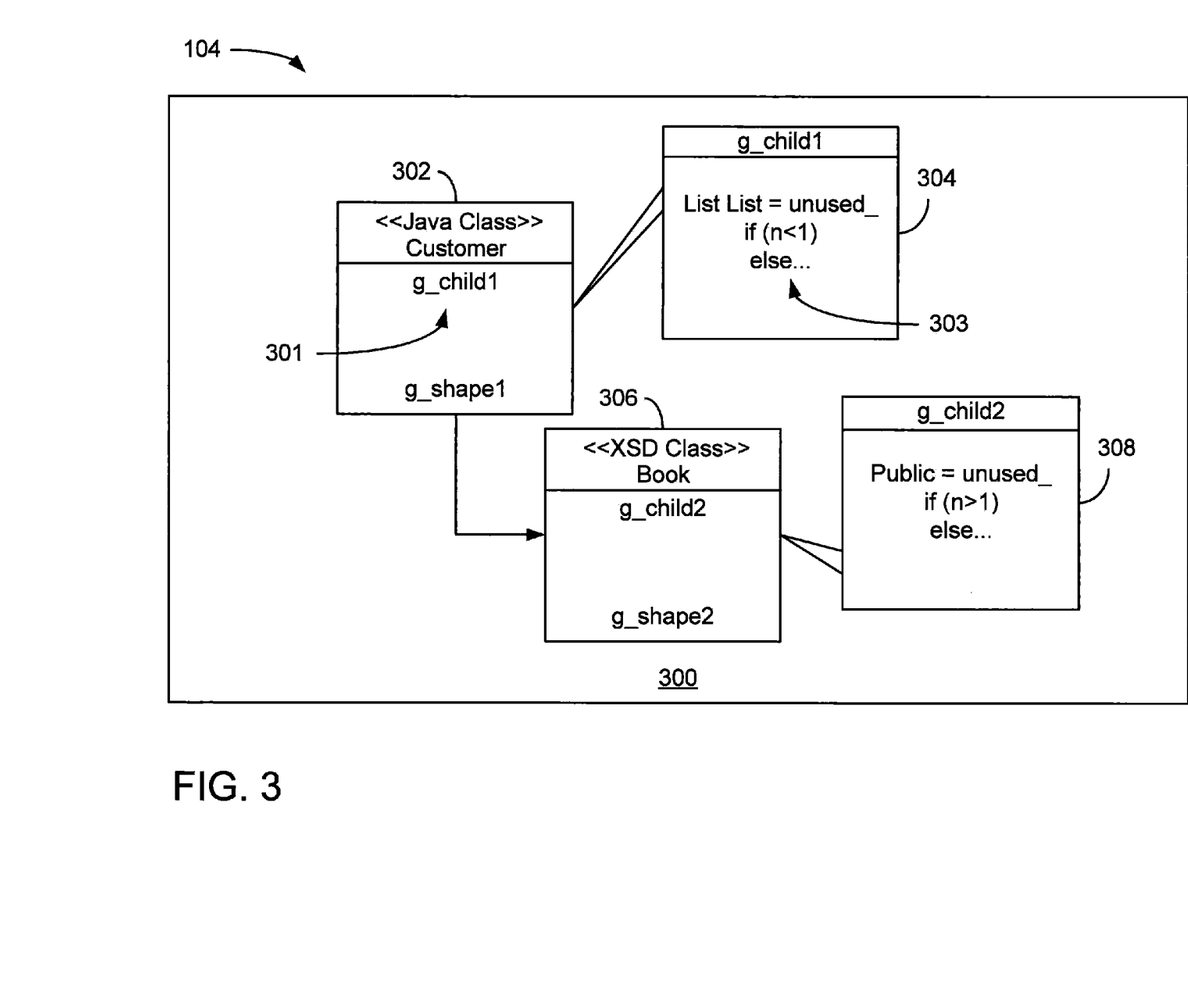
FIG. 3 illustrates an exemplary embodiment of a portion of a diagram.

FIG. 3 illustrates an exemplary embodiment of a portion of a diagram 300 that may be presented to a user on the display 104. The diagram 300 includes a graphical shape 302 ("g_shape1") that represents a particular Java class ("customer") model element. A hot spot 301 ("g_child") is displayed in the graphical shape 302. The hot spot 301 is associated with a model element, which will be described in further detail below. The diagram 300 also includes a graphical shape 306 that is similar to the graphical shape 302 described above, but represents a particular XSD class ("book") model element. The shapes 302 and 306 are connected and visually represent a logical flow relationship of a computer code.

In operation, the diagram 300 includes any number of graphical shapes similar to the graphical shapes 302 and 306. A user may use diagram 300 to analyze and manipulate computer code. The hot spot 301 is selectable by the user who may, for example, select the hot spot using an input device 106 that sends an input to the system 100 (of FIG. 1). Once selected the code 303 associated with the hot spot is presented in a fly-out editor window 304. The user may view and manipulate or edit the code 303 in the fly-out editor window 304. If the user edits the code 303, the edited code is synchronized with and saved in the corresponding API 202 (of FIG. 2). The fly-out editor window 308 is similar to the fly-out editor window 304.

Figure 4A:
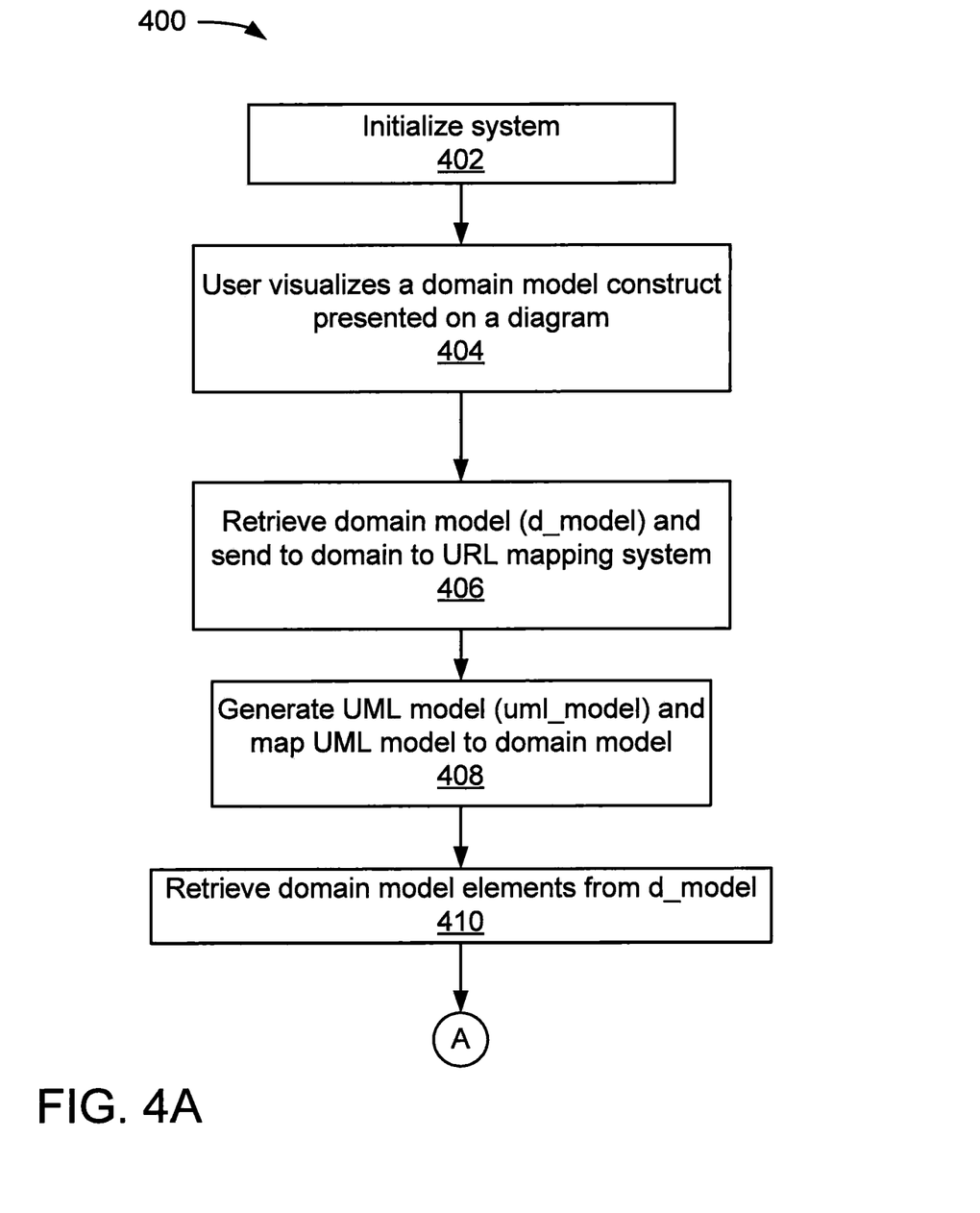
FIGS. 4A and 4B illustrate exemplary block diagram detailing the generation of the model diagram of FIG. 3.
Figure 4B:
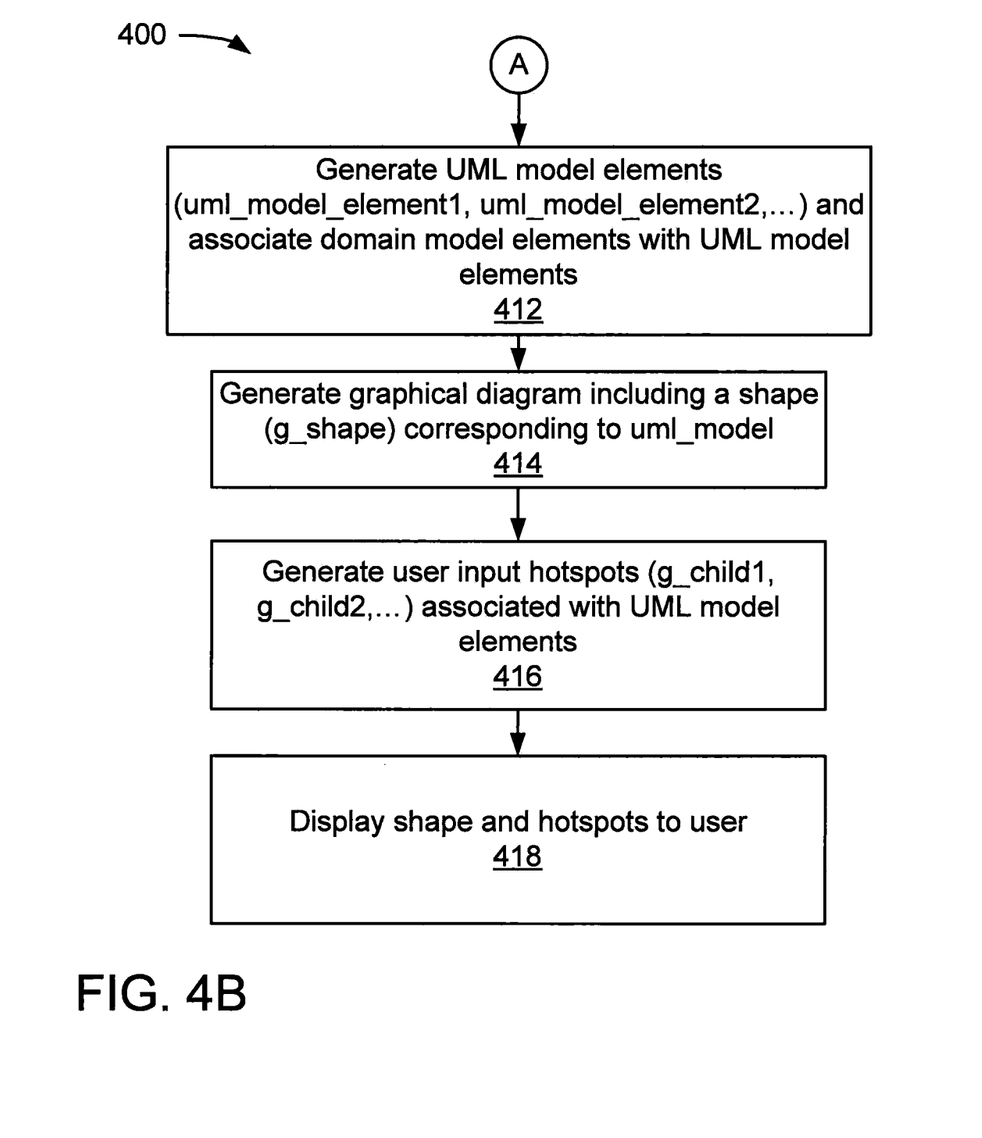

FIGS. 4A and 4B illustrate exemplary block diagram 400 detailing the generation of the diagram 300. Referring to FIG. 4A, the system 100 is initialized in block 402. Scoped language domain editor extenders (for each API 202, 204, and 206) are registered against corresponding domain model elements (e.g., d_model element1, d_model element2, ...), and the domain model parsers are registered against the APIs. In block 404, a domain model construct is presented to a user in a diagram. In block 406, the domain model (e.g., d_model) is retrieved from an API and is sent to the domain to UML mapping system. A UML model (e.g., uml_model) is generated and mapped to the domain model in block 408. In block 410, domain model elements are retrieved from the domain model. In block 412, UML model elements (e.g., uml_model_element1, uml_model_element2, ...) are generated and associated with corresponding domain model elements. Referring to FIG. 4B, a graphical diagram (class diagram) is generated including shapes (e.g., g_shape) associated with (and corresponding to) the UML model in block 414. In block 416, user input hot spots are generated (e.g., g_child1, g_child2, ...) and are associated with UML model elements. The shapes and hot spots are displayed in block 418.

Figure 5A:
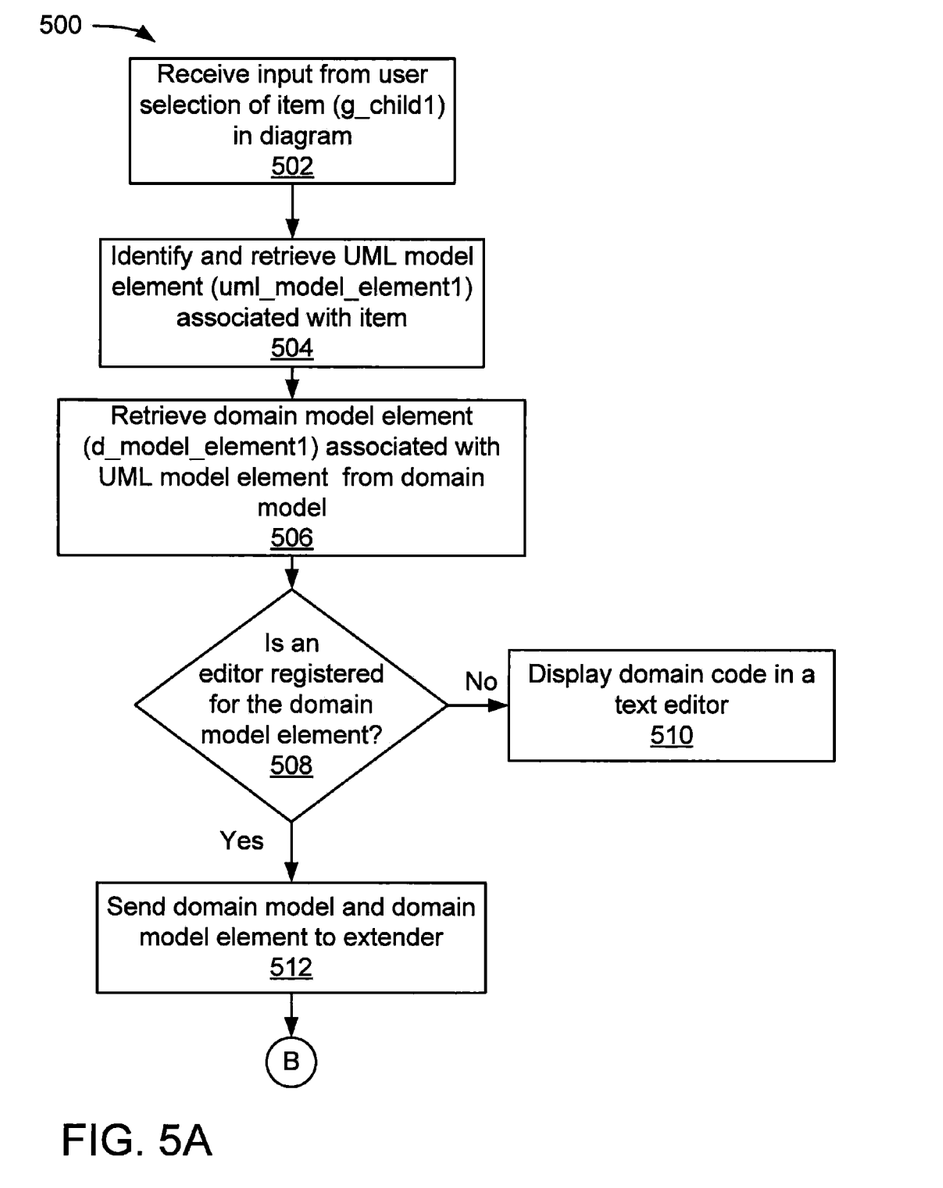
FIGS. 5A and 5B illustrate exemplary block diagram detailing the generation and display of fly-out editor windows of FIG. 3.
Figure 5B:
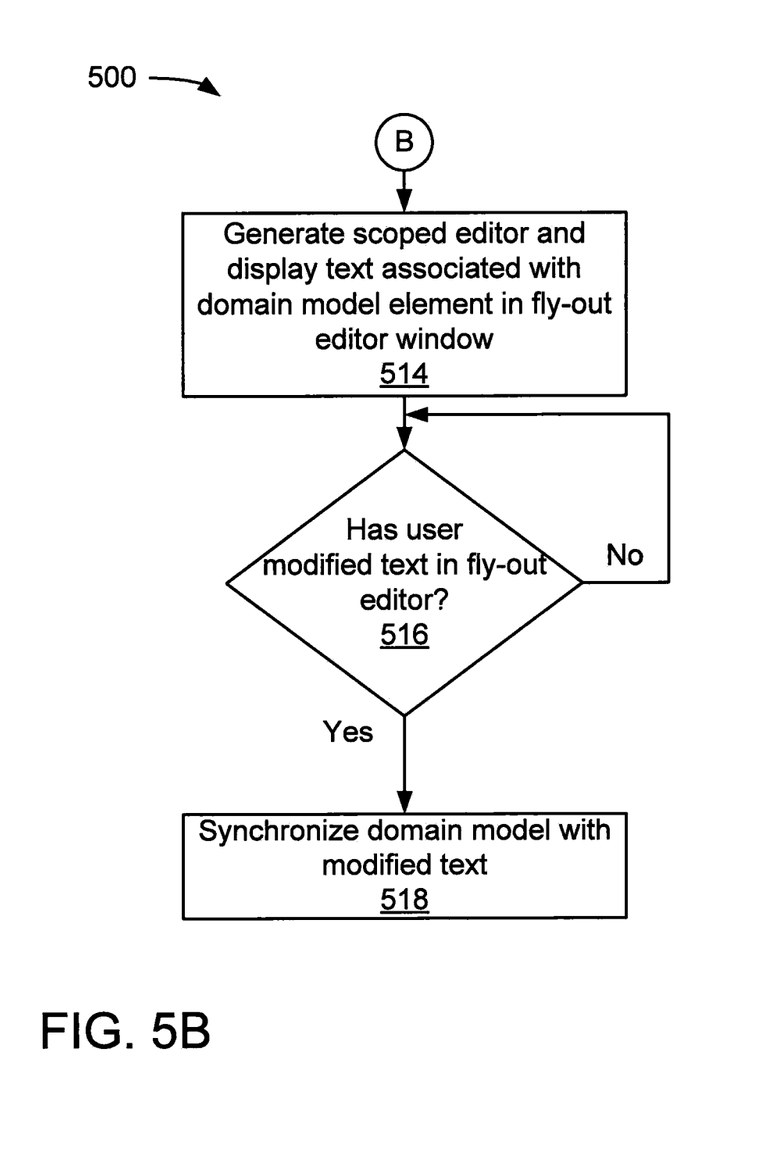

FIGS. 5A and 5B illustrate exemplary block diagram 500 detailing the generation and display of fly-out editor windows (304 and 308). Referring to FIG. 5A, in block 502, a user input is received. The user input may include, for example, a user selecting a hot spot (item) (g_child1) in the diagram 300 (of FIG. 3). In block 504 the UML model element (uml_model_element1) associated with the selected item is identified and retrieved from the UML model (uml_model). The domain model element associated with the UML model element is retrieved from the domain model (d_model) in block 506. In block 508, if a code editor is not registered for the domain model element, then in block 510 the domain code associated with the domain element may be displayed in a separate text editor window, such as a default or simple text editor (not shown). If a code editor is registered for the domain model element, the domain model and the domain model element are sent to the registered extender in block 512. In block 514 a scoped editor is generated that displays text (code) associated with the domain model element in a fly out editor window. The scoped editor displays only the code associated with the identified domain model element. The user may modify the displayed code in the context of the entire domain model. For example, user actions or inputs in the scoped editor may result in feedback and/or content assistance from associated fields and elements in the domain model (that may or may not be presented to the user in the scoped editor). In block 516, if the user has modified or edited the text in the fly-out editor window, then the modified text is sent to the domain model, and in block 518, the domain model is synchronized with the modified text.

The technical effects and benefits of the methods and systems described above, allow a diagram that includes elements from any number and variety of source code domains and API's to be presented simultaneously to a user. The user may select one or more elements (including elements with dissimilar source code domain types) in the presented diagram, which generates a fly-out editor corresponding to the selected element. The fly-out editor only displays source code associated with the selected element (scoped code) allowing the user to quickly and easily analyze and edit the source code for the element in the context of the entire domain model. If the user edits the scoped code, the edited code is returned to the associated domain model where the code is synchronized. The user may also save the edited code in an updated domain model.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated The flow diagrams depicted herein are just one example. There may be many variations to this diagram or the steps (or operations) described therein without departing from the spirit of the invention. For instance, the steps may be performed in a differing order or steps may be added, deleted or modified. All of these variations are considered a part of the claimed invention.

While the preferred embodiment to the invention had been described, it will be understood that those skilled in the art, both now and in the future, may make various improvements and enhancements which fall within the scope of the claims which follow. These claims should be construed to maintain the proper protection for the invention first described.

What is claimed is:

1. A method for generating a model diagram, the method including:
   registering, by a processor, a first scoped domain editor extender against a first domain model element, wherein the first domain model element has a first source code domain type, wherein the first scoped domain editor extender enables a scoped code editor to display code associated with the first domain model element, wherein the displayed code is displayed directly from the source code of the first domain model element, and wherein the displayed code is editable directly to the source code associated with the first domain model element;
   registering, by the processor, a second scoped domain editor extender against a second domain model element, wherein the second domain model element has a second source code domain type dissimilar to the first source code domain type, wherein the second scoped domain editor extender enables the scoped code editor to display code associated with the second domain model element, wherein the displayed code is displayed directly from the source code of the second domain model element, and wherein the displayed code is editable directly to the source code associated with the second domain model element;
   retrieving a domain model including the first domain model element and the second domain model element;
   generating a modeling language model and mapping the modeling language model to the domain model, the modeling language model including at least: a first modeling language model element that corresponds to the first domain model element and a second modeling language model element that corresponds to the second domain model element;
   generating a graphical diagram including a plurality of shapes, each shape corresponding to an associated modeling language model element;
   generating a user input item and associating the user input item with the modeling language model element for select ones of the shapes;
   receiving an input from a user selecting a generated input item;
   identifying and retrieving the modeling language model element associated with the selected input item;
   retrieving the domain model element associated with the modeling language model element from the domain model;
   determining whether a scoped editor extender is registered for the retrieved domain model element;
   sending the domain model element to the scoped editor extender responsive to determining that the scoped editor extender is registered for the domain model element; and
   generating the scoped code editor so as to display the source code of the domain model element in a fly-out editor window.

2. The method of claim 1, wherein the method further includes:
   determining whether the user has modified the code in the fly-out editor window; and
   synchronizing the modified code and the domain model responsive to determining that the user has modified code text in the fly-out editor window.

3. The method of claim 2, wherein the method further includes displaying domain code associated with the domain model in a text editor responsive to determining that the editor is not registered for the domain model element.

4. The method of claim 3, wherein the domain code is displayed in a text editor window.

5. The method of claim 1, wherein the domain model includes a Java type domain model.

6. The method of claim 1, wherein the domain model includes a C++ type domain model.

7. A method for generating a fly-out editor window, the method including:
   generating a graphical diagram including a plurality of shapes, each shape corresponding to an associated modeling language model element of a corresponding modeling language model;
   generating a user input item and associating the user input item with the modeling language model element for select ones of the shapes;
   receiving an input from a user selecting an input item associated with a corresponding shape;
   identifying and retrieving the modeling language model element associated with the selected input item;
   retrieving a domain model element associated with the modeling language model element from a domain model, where the domain model comprises at least a first domain model element having a first source code domain type, and a second domain model element having a second source code domain type dissimilar to the first source code domain type;
   determining whether a scoped editor extender is registered against the retrieved domain model element;
   sending the domain model element to the scoped editor extender responsive to determining that the scoped editor extender is registered for the domain model element;
   generating the scoped code editor with full domain model context so as to display source code of the domain model element in a fly-out editor window, wherein the displayed code is displayed directly from the source code associated with the domain model element, and wherein the displayed code is editable directly to the source code associated with the domain model element.

8. The method of claim 7, wherein the method further includes:
   determining whether the user has modified the code in the fly-out editor window; and
   synchronizing the modified text and code domain model responsive to determining that the user has modified the code in the fly-out editor window.

9. The method of claim 8, wherein the method further includes generating domain code associated with the domain model for editing in a text editor responsive to determining that a scoped editor extender is not registered for the domain model element.

10. The method of claim 9, wherein the domain code is displayed in a text editor window.

11. The method of claim 7, wherein the domain model includes a Java type domain model.

12. The method of claim 7, wherein the domain model includes a C++ type domain model.

13. A system for generating a diagram comprising:
   a processor coupled to a memory, wherein the processor is programmed to:

register a first scoped domain editor extender against a first domain model element, wherein the first domain model element has a first source code domain type, wherein the first scoped domain editor extender enables an editor to display code associated with the first domain model element, wherein the displayed code is displayed directly from the source code of the first domain model element, and wherein the displayed code is editable directly to the source code associated with the first domain model element;

register a second scoped domain editor extender against a second domain model element, wherein the second domain model element has a second source code domain type dissimilar to the first source code domain type, wherein the second scoped domain editor extender enables the editor to display code associated with the second domain model element, wherein the displayed code is displayed directly from the source code of the second domain model element, and wherein the displayed code is editable directly to the source code associated with the second domain model element;

retrieve a domain model including the first domain model element and the second domain model element;

generate a modeling language model and map the modeling language model to the domain model, the modeling language model including at least: a first modeling language model element that corresponds to the first domain model element and a second modeling language model element that corresponds to the second domain model element;

generate a graphical diagram including a plurality of shapes, each shape corresponding to an associated modeling language model element; and generate a user input item and associating the user input item with the modeling language model element for select ones of the shapes;

receive an input from a user selecting a generated input item;

identify and retrieve the modeling language model element associated with the selected input item;

retrieve the domain model element associated with the modeling language model element from the domain model;

determine whether a scoped editor extender is registered for the retrieved domain model element;

send the domain model element to the scoped editor extender responsive to determining that the scoped editor extender is registered for the domain model element; and generate the scoped code editor so as to display the source code of the domain model element in a fly-out editor window.

14. The system of claim 13, wherein the processor is further operative to:

determine whether the user has modified the code in the fly-out editor window; and synchronize the modified code and the domain model responsive to determining that the user has modified the code in the fly-out editor window.

15. The system of claim 14, wherein the system is further operative to display the domain code associated with the domain model in a text editor responsive to determining that the scoped editor is not registered for the domain model element.

16. The system of claim 15, wherein the domain code is displayed in a text editor window.

17. The system of claim 13, wherein the processor is further operative to send the shape and the user input item to a display.

18. The method of claim 1 further including: displaying the shape and the user input item to a user.

* * * * *